United States Patent [19]

Rogalski

[11] Patent Number: 4,660,792
[45] Date of Patent: Apr. 28, 1987

[54] HOLDER FOR VCR AND TV REMOTE CONTROLS

[76] Inventor: Lawrence D. Rogalski, 33440 Trafalgar La., Apt. No. 8, Westland, Mich. 48185

[21] Appl. No.: 799,788

[22] Filed: Nov. 20, 1985

[51] Int. Cl.[4] .................................... A45D 19/04
[52] U.S. Cl. .................................... 248/174; 248/205.2
[58] Field of Search ............... 248/174, 150, 152, 1, 248/205.2, 450, 359.1; 273/148 B; 206/472, 473; 150/52 R; 190/901

[56] References Cited

U.S. PATENT DOCUMENTS

| | | | |
|---|---|---|---|
| 2,299,673 | 10/1942 | Zolkind | 190/901 X |
| 3,339,608 | 9/1967 | Brenner | 150/52 R |
| 3,380,504 | 4/1968 | Green | 150/52 R |
| 4,259,568 | 3/1981 | Dynesen | 150/52 R X |
| 4,423,834 | 1/1984 | Rush | 190/901 X |

Primary Examiner—Ramon O. Ramirez
Attorney, Agent, or Firm—Brooks & Kushman

[57] ABSTRACT

A holder (10) for VCR and TV remote controls is disclosed as including an elongated panel (12) of a cushioned sheet-like construction having a front side (14) and a back side (16). The panel (12) includes holder and cover portions (18,20) having first ends connected to each other and also having second spaced ends (26,28). The front side (14) of the holder portion (18) includes retainers (30) for detachably securing VCR and TV remote controls in a side-by-side relationship. A pocket (36) of the holder portion (18) receives the VCR and TV remote controls to cooperate with the retainers (30) in providing detachable securement of the remote controls on the holder portion. Fasteners (38) of panel (12) secure the cover portion (20) to the front side (14) of the holder portion (18) for storage or to the back side (16) of the holder portion to permit access to the remote controls for use.

6 Claims, 4 Drawing Figures

U.S. Patent     Apr. 28, 1987     4,660,792
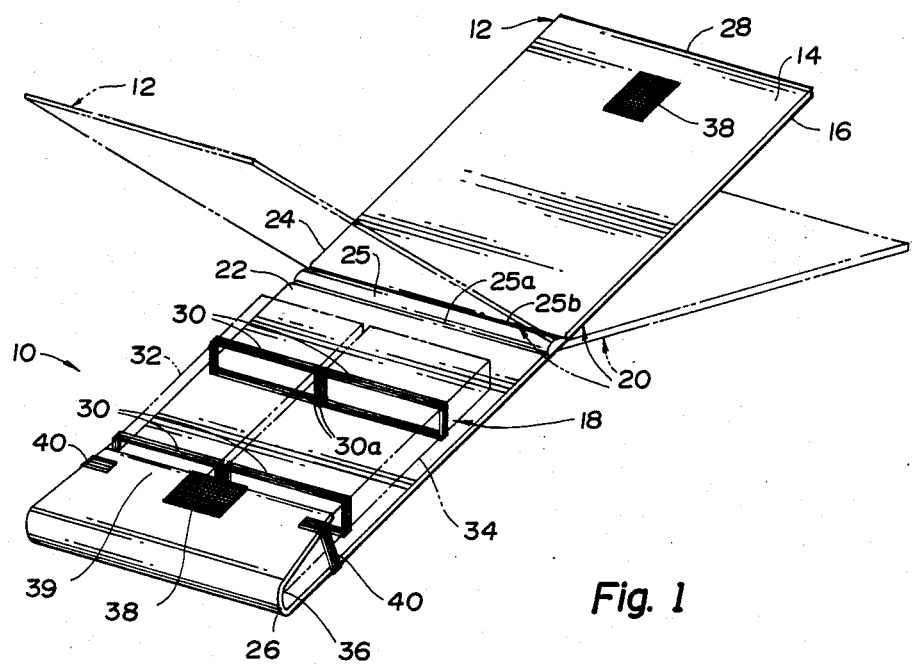
Fig. 1
Fig. 2
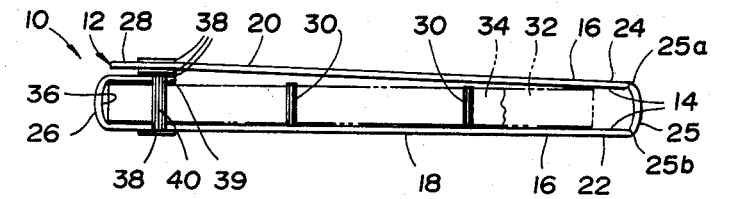
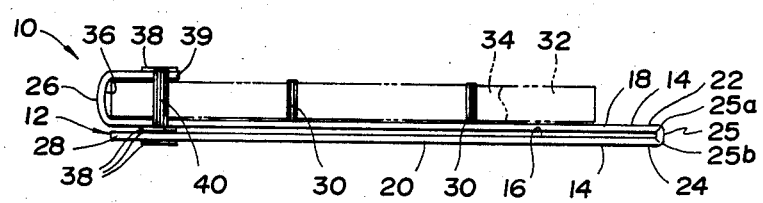
Fig. 3
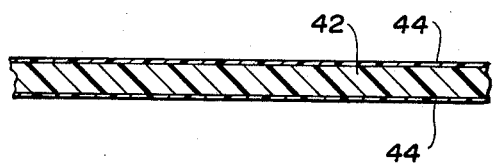
Fig. 4

HOLDER FOR VCR AND TV REMOTE CONTROLS

TECHNICAL FIELD

This invention relates to a holder for VCR and TV remote controls of the type used with home entertainment devices.

BACKGROUND ART

Remote controls for VCRs and TVs have recently become increasingly popular. Typically, remote controls for both VCRs or TVs comprise hand held, plastic or metal cased transmitters. Although these controls provide a convenient means for controlling VCRs and TVs, the controls are often misplaced and can scratch household furniture.

DISCLOSURE OF INVENTION

An object of the present invention is to provide a holder for VCR and TV remote controls in order to protect furniture from being scratched and to also maintain the VCR and TV remote controls together for convenience of use without being misplaced.

In carrying out the above object and other objects of the invention, a holder for VCR and TV remote controls constructed in accordance with the invention comprises an elongated panel of a cushioned sheet-like construction having front and back sides. The panel has holder and cover portions including first ends connected to each other and second ends that are spaced from the first ends and define opposite ends of the panel. The front side of the holder has retainers for detachably securing VCR and TV remote controls in a side-by-side relationship with respect to each other, and the second end of the holder includes a pocket for receiving the VCR and TV remote controls in cooperation with the retainers. Fasteners of the panel secure the cover portion to the front side of the holder over the controls for storage or to the back side to permit access to the controls for use.

Such a cushioned holder prevents the stored VCR and TV remote controls from scratching furniture surfaces. By maintaining both the VCR and TV remote controls together, the chance of losing one or both is reduced since the two are larger than either one and the holder can be made of a colorful material for easier perception. Also, the securement of the remote controls by the holder creates a central control center for operating both a VCR and a TV.

In the preferred construction, the retainers for attaching the controls to the holder are embodied by two pairs of elastic loops. The pocket connected to the second end of the holder is provided by a flap folded over the front side of the holder portion of the panel and has elastic straps that secure the flap to the holder portion. Preferably, the fasteners for securing the cover are embodied by pieces of Velcro secured to the opposite ends of the panel on the front and back sides to provide the securement of the cover over the remote controls for storage or to the back side of the holder portion so the remote controls can be used. The panel preferably comprises a foam rubber insert and a cloth-like covering that receives the foam rubber insert.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of the holder for VCR and TV remote controls constructed in accordance with the present invention and illustrated with a cover portion thereof in partially closed and partially folded back positions;

FIG. 2 is a side view illustrating the cover portion folded over the front side of the holder portion for storage of the controls;

FIG. 3 is a side view illustrating the cover portion folded over the back side of the holder portion to permit access to the controls for use; and FIG. 4 is a sectional view of the holder panel illustrating a foam rubber insert and a cloth-like covering that receives the foam insert.

BEST MODE FOR CARRYING OUT THE INVENTION

Referring to FIG. 1 of the drawings, a VCR and TV remote control holder constructed in accordance with the present invention is generally indicated by reference numeral 10 and is used for detachably securing a VCR and/or TV remote control. As is hereinafter more fully described, the holder 10 provides a common control source for both a VCR and a TV. The holder 10 also protects household furnishings from being scratched by the remote controls and reduces the possibility of misplacing either remote control.

As shown in FIG. 1, the holder 10 comprises an elongated panel 12 of a cushioned sheet-like construction having a front side 14 and a back side 16. The holder panel 12 has a holder portion 18 and cover portion 20 including first ends 22 and 24 connected to each other by a hinge connection 25. Holder and cover portions 18 and 20 also have second ends 26 and 28 spaced from the first ends adjacent the hinge connection 25. The front side 14 of the holder portion 18 of the panel 12 includes retainers 30 for detachably securing a VCR remote control 32 and/or a TV remote control 34 in a side-by-side relationship with respect to each other. On the second end 26 of the holder portion 18 a pocket 36 is provided for receiving the adjacent ends of the VCR remote control 32 and TV remote control 34. The pocket 36 cooperates with the retainers 30 to detachably secure the remote controls to the holder portion 18. Fasteners 38 of the panel 12 secure the cover portion 20 to the front side of the holder portion 18 over the remote controls for storage or to the back side 16 to permit access of the remote controls for use as is hereinafter more fully described.

FIG. 2 illustrates the holder 10 in the storage position with the cover portion 20 folded over the front side 14 of the holder portion 18 and over the remote controls. The pair of fasteners 38 on the front side of panel 12 secure cover portion 20 to the front of the holder portion 18 in this storage position.

FIG. 3 illustrates the holder 10 in its use position where the VCR and TV remote controls 32 and 34 are accessible for use. In this use position, the cover portion 20 is folded over the back side 16 of the holder portion 18 and is secured thereto by the pair of fasteners 38 on the back side of panel 12.

In the preferred embodiment, the retainers 30 comprise two pairs of elastic loops that have stiched connections 30a to the front side of panel 12 at a generally central location as shown in FIG. 1. Also, the pocket 36 comprises a flap 39 connected to the second end 26 of the holder portion 18. This flap is folded over the front side 14 of the holder portion 18 and is fastened thereto by elastic straps 40. The fasteners 38 that secure the cover portion 20 to the front side 14 of the holder portion in the storage position and to the back side 16 of the holder portion in the exposed use position of the remote controls comprise pieces of Velcro secured to the opposite ends of the elongated panel 12 on the front and back sides.

FIG. 4 is a sectional view illustrating the preferred construction of the elongated panel 12 wherein the panel comprises a foam rubber insert 42 and a cloth-like covering 44 that receives the foam insert.

Also, the hinge connection 25 of panel 12 is preferably provided by a pair of adjacent stitchings 25a and 25b that extend through the foam insert 42 and covering 44 shown in FIG. 4. These hinge stitchings 25a and 25b extend from one side to the other side of the panel 12 to facilitate the folding of cover portion 12 between the storage and use positions.

While the best mode for carrying out the invention has been described in detail, those familiar with the art to which this invention relates will recognize various alternative designs and embodiments for practicing the invention as defined by the following claims.

What is claimed is:

1. A holder for VCR and TV remote controls comprising: an elongated panel of a cushioned sheet-like construction having front and back sides; said panel having holder and cover portions including first ends connected to each other and second ends spaced from the first ends thereof and defining opposite ends of the panel; the front side of the holder portion of the panel including retainers for detachably securing VCR and TV remote controls in a side-by-side relationship with respect to each other; the second end of the holder portion of the panel including a flap folded over the front side thereof; means for securing the flap to the holder portion to define a pocket for receiving the VCR and TV remote controls to cooperate with the retainers in providing detachable securement thereof; and fasteners for securing the cover portion to the front side of the holder portion over the controls for storage or to the back side thereof to permit access to the controls for use.

2. A holder as in claim 1 wherein the retainers comprise two pairs of elastic loops.

3. A holder as in claim 1 wherein said means comprises elastic straps that secure the flap to the holder portion.

4. A holder for VCR and TV remote controls comprising: an elongated panel of a cushioned sheet-like construction having front and back sides; said panel having holder and cover portions including first ends connected to each other and second ends spaced from the first ends thereof and defining opposite ends of the panel; the front side of the holder portion of the panel including retainers for detachably securing VCR and TV remote controls in a side-by-side relationship with respect to each other; the second end of the holder portion of the panel including a pocket for receiving the VCR and TV remote controls to cooperate with the retainers in providing detachable securement thereof; and fasteners including pieces of Velcro secured to the opposite ends of the panel on the front and back sides thereof to provide the securement of the cover portion over the controls for storage or to the back side of the holder portion to permit access to the controls for use.

5. A holder as in claim 1 wherein the panel comprises a foam rubber insert and a cloth-like covering that receives the foam insert.

6. A holder for VCR and TV remote controls comprising: an elongated panel having front and back sides; said panel including a foam insert and a cloth-like covering that receives the foam insert; said panel having holder and cover portions including first ends connected to each other and second ends spaced from the first ends thereof and defining opposite ends of the panel; the front side of the holder portion of the panel including two pairs of elastic loops for detachably securing VCR and TV remote controls in a side-by-side relationship with respect to each other; the second end of the holder portion of the panel including a flap folded over the front side thereof to define a pocket; elastic straps that secure the flap to the holder portion such that the pocket can receive the VCR and TV remote controls in order to cooperate with the elastic loops in providing detachable securement thereof; and Velcro fasteners on the front and back sides of the panel adjacent the second ends thereof for securing the cover portion to the front side of the holder portion over the controls for storage or to the back side thereof to permit access to the controls for use.

* * * * *